Oct. 3, 1950  M. K. TAYLOR  2,524,579
DETECTION OF PHENOMENA CAPABLE
OF SETTING UP VIBRATION
Filed Nov. 7, 1947
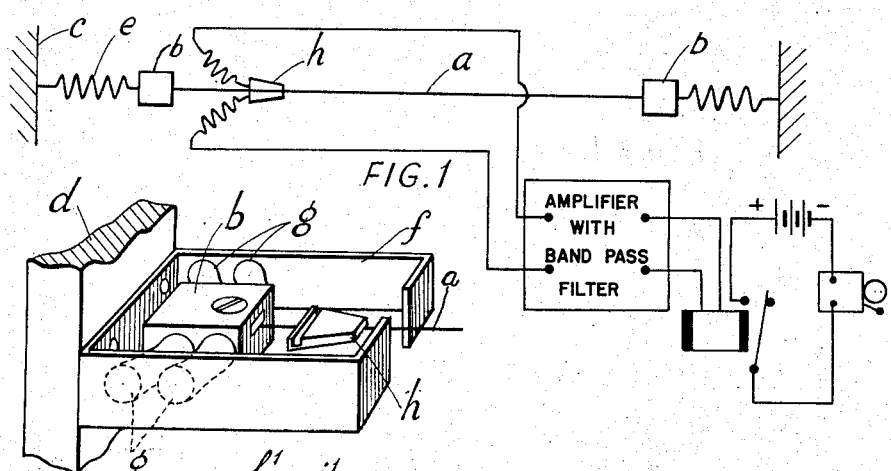
FIG.1
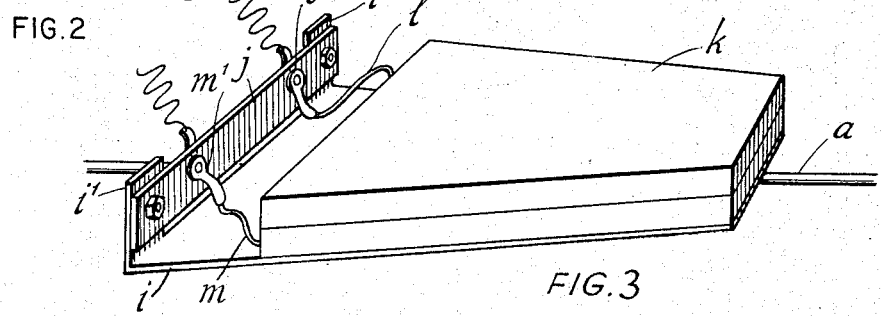
FIG.2
FIG.3
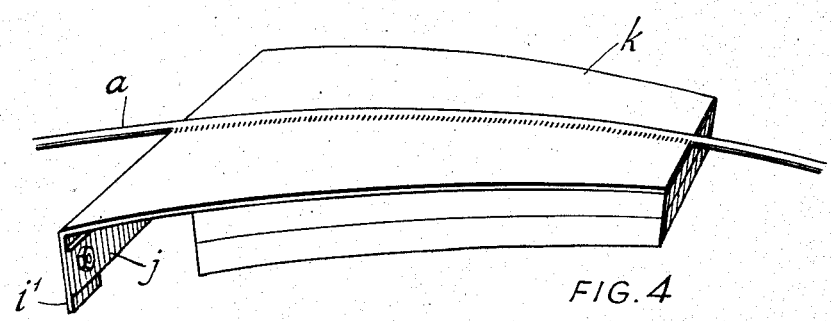
FIG.4
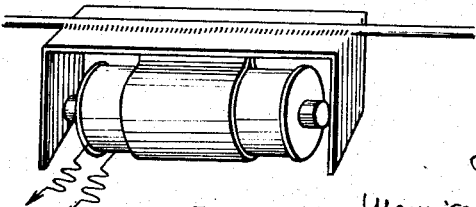
FIG.5
Inventors:
Maurice Kenyon Taylor Patented Oct. 3, 1950

2,524,579

UNITED STATES PATENT OFFICE 2,524,579

DETECTION OF PHENOMENA CAPABLE OF SETTING UP VIBRATION

Maurice Kenyon Taylor, East Lothian, Scotland

Application November 7, 1947, Serial No. 784,554
In Great Britain November 9, 1946

9 Claims. (Cl. 171—327)

This invention relates to the detection of frictional contact through vibrations set up thereby.

An example of the type of problem with which the invention is concerned arises in connection with roving, drawing or similar processes in the textile industry. Breakage of a sliver, for example, is often difficult to detect visually because of the concealing effect of the surrounding apparatus or because one operative has to supervise more than one frame, whilst the breakage is difficult to detect by feeler mechanism actuating through mechanical or electrical relays or by such devices as photo-electric cells. In the following description reference is made to the application of the invention to the problem just stated, but it is to be understood that the invention is not so limited.

The difficulty as already stated in using a vibratable object such as a taut wire in the manner mentioned above lies in the fact that the object is likely to be set in mechanical oscillation at its resonant frequency as a consequence of disturbances of a general character such as machine vibration, noise and the like. The invention is concerned with the overcoming of this difficulty.

It can be shown that if for example a broken sliver is allowed to drag across a vibratable object such as a stretched wire or other cord-like member, mounted for resonant vibration, detectable vibrations are set up therein some of which are of high frequencies of the order of at least 4 kilocycles per second.

The present invention is based upon an appreciation of the fact that the high frequency vibrational response of such member is greater to such frictional contact than to impact of vibrations due to extraneous sources.

According to the invention means for detecting frictional contact through vibrations set up thereby comprise a resilient member mounted for resonant vibration and exposed for the direct frictional contact to be detected, and an electrical detector element sensitive to flexing of short length relative to the fundamental resonant wave length of the resilient member, mounted on said member so as to be flexed by vibration in said member only of a wave length comparable to the length of such detector element, and electrical means for amplifying and utilising the reaction or such detector element.

Also in accordance with the invention means for detecting frictional contact through vibrations set up thereby comprise a resilient cord-like member mounted relatively rigidly at its ends and under tension, part of said member being exposed for the direct frictional contact to be detected, an electrical detector element sensitive to flexing and of short length relative to the length of the cord-like member and so mounted on the resilient cord-like member as to be flexed by vibrations thereon only of wave length comparable to the length of the detector element, and electrical means for amplifying and utilising the reaction of such detector element:

In the accompanying drawings—

Fig. 1 is a diagrammatic view showing a theoretical example of detector means made in accordance with the invention;

Fig. 2 is a diagrammatic perspective view of one end of one practical embodiment of the invention;

Fig. 3 is a detail view to a larger scale showing the crystal detector element of Fig. 2;

Fig. 4 is a theoretical perspective diagram (inverted relative to Fig. 3) showing the bending of the crystal detector element of Fig. 3;

Fig. 5 is a detail perspective view of an electro-magnetic type of detector element made and used in accordance with the invention.

The apparatus illustrated in Figs. 1 to 4 is suitable for use in a roving frame to detect the breakage of a sliver. It consists of a wire $a$ of 30 S. W. G. steel piano wire of 60 ft. in length, each end of which is rigidly secured to a metal inertia mass $b$ which masses are resiliently suspended from an anchorage, shown diagrammatically as $c$ in Fig. 1 and as a frame member $d$ in Fig. 2, by means of a tensioning device shown diagrammatically in Fig. 1 as a spring $e$ and in Fig. 2 as a frame $f$ carrying rubber cords $g$. Attached to the wire is a piezoelectric crystal $h$ of the bender type about ¾ inch in length. As shown in Fig. 2 the frame $f$ is felt-lined and arranged to form a protective screen for the crystal.

As shown in more detail in Fig. 3 there is a brass plate $i$ 0.0005 inch in thickness which is shaped as a truncated isosceles triangle and is rigidly attached by its axis of symmetry to the wire. The plate is formed at its base end with upturned lugs $i'$ carrying a terminal strip $j$, while rigidly cemented to such plate is a bender type crystal unit $k$ of similar shape, the electrodes of which are connected by flexible leads $l$ and $m$ to terminals $l'$ and $m'$.

The apparatus is mounted so that the wire is held taut across the roving frame in such a position that in the event of a sliver breaking, one end will fall onto the wire and be drawn across it. The mounting enables the wire to be held in tension to form a resilient member mounted for resonant vibration which is relatively isolated by the rubber from any vibration of the machine frame.

The piezo-electric crystal $h$ (Fig. 1) is connected in known manner to a valve amplifier with band pass filter which in turn yields a control voltage which may be used to operate an indicator for instance an electromagnet connected to the amplifier and having an armature controlling a circuit containing a battery and an electric bell in series.

In operation, the drag of a broken end of sliver across the wire sets up lateral vibrations in the wire; these are reflected and thus maintained by the metal masses at the ends of the wire. These lateral vibrations cause the crystal to oscillate, which in turn supplies an oscillatory voltage input to the amplifier for yielding the control voltage. Crystal and amplifier are so designed as to be responsive to a band including the majority of those frequencies to which the drag of broken sliver across the wire gives rise, for example of the order of more than 4 kilocycles per second, whilst excluding the majority of those frequencies due to unwanted mechanical vibration or sound which may reach the crystal. Any low frequency vibration of the wire, for instance at its natural frequency, has no effect on the crystal since the length of the crystal is short compared with the wave length of the vibration in the wire and the crystal mainly moves bodily with such vibrations. In addition to indicating that a sliver is broken the output from the amplifier may be used to operate a relay so as to stop the frame in order that the sliver may be pieced up.

It will be seen from the above description that an essential feature of the apparatus is its operation only at frequencies higher than those likely to occur through natural causes in the neighborhood of the apparatus.

In further explanation, it is to be observed that there is, of course, no necessity to specify any one plane of vibration or any relative position of crystal plane and vibration plane, since the energy will inevitably be shared amongst the various degrees of freedom and, however the system started to vibrate, some of the vibration will ultimately appear as transverse vibration in a plane such as to cause suitable bending of the crystal.

Preferential response to vibration produced by frictional contact of a broken thread rather than to machine vibration or other extraneous sources arises from a combination of the following causes:

(I) The mounting for the wire is such as to render it difficult for the wire to be set into vibration at its fundamental frequency (or at harmonics) by outside vibration by transmission through such mounting.

(II) The provision of a felt-lined protective screen for the crystal to reduce the effect of extraneous atmospheric vibration.

(III) The crystal response is low at the fundamental frequency of the wire and becomes appreciable only for quite high order harmonics of this frequency, which are unlikely to be excited by external vibration. For the crystal to produce an appreciable output voltage, it must be subjected to an appreciable amount of bending which will occur only if the wave length of the wire vibration is comparable with the length of the crystal, that is, at high frequencies only, since the crystal is only ¾" long.

At lower frequencies of vibration the crystal, being freely supported by the wire, will simply move as a whole without bending and will therefore produce little or no output voltage.

(IV) The amplifier is a high-pass one, and does not amplify such low frequencies as are likely to be produced at its input because of external vibration. For instance the amplifier may be designed to have a high gain at high frequencies only, that is, 4 kilocycles and above, whereas the fundamental frequency of the wire is probably of the order of 100 cycles or less.

(V) Vibration excited directly in the wire by broken threads gradually builds up in intensity since, because of the terminating masses between which the wire is slung, there is little energy loss by communication of vibration to the external supports.

As a result of a broken thread trailing across the wire, a vibratory disturbance travels from the point of frictional contact towards both ends. The terminating masses ensure that these disturbances are reflected with little energy loss so that for a single initial disturbance, the crystal responds to a whole sequence of such disturbances. Furthermore the continued trailing of the thread across the wire produces fresh disturbances in random phases so that the vibrational energy of the wire increases until the crystal voltage response to such an excitation becomes very considerable.

It will thus be seen that the terminating masses are important since they serve the double purpose of insulating the wire from external vibration, and increasing its sensitivity to directly excited vibration.

Details of the above apparatus may of course be varied without departing from the invention.

The device is effective as a burglar alarm by attaching the piezoelectrical crystal unit to a window pane. The use of a diamond on the window pane to cut the same, a common preliminary to unlawful entry, will set up high frequency vibrations, to which the piezoelectric crystal will be responsive, whilst the normal vibration of the window pane in response to sound or traffic vibration will be mainly of the order of its fundamental resonant frequency which will substantially not affect the crystal for the same reason, as explained for the crystal mounted on a wire, because vibration at such frequency mainly causes bodily movement whereas the high frequency vibrations caused by the diamond operate to bend the crystal.

As shown in Fig. 5 the detector consists of a magnetic core $n$ and electric winding $o$ thereon, suspended by a central mounting from a thin plate $p$ of magnetic material, replacing the thin brass plate of the preceding example, the ends of the plate being bent at right angles to lie across and in close proximity to the ends of the core, thereby forming short air gaps and an external magnetic circuit. Bending of the plate with the wire will vary the length and hence the reluctance of such air gaps and the resulting variation of the flux linking the coil may be used in known manner in place of the crystal.

What I claim is:

1. A device for detecting frictional contact comprising in combination a resilient member capable of vibrating when exposed to frictional contact; mounting means for said resilient member exposing the same to such contact; an electrical detector element mounted on said resilient member and adapted for generating voltages in response to flexing of a short length relative to the fundamental resonant wave length of said resilient member, the said detector element having a low response to the fundamental frequency of the said resilient member; and electrical means for amplifying and utilizing the said voltages.

2. A device for detecting frictional contact comprising in combination a resilient member capable of vibrating when exposed to frictional contact; mounting means for said resilient member exposing the same to such contact; an electrical detector element mounted on said resilient member and adapted for generating voltages in response to flexing of a short length relative to the fundamental resonant wave length of said resilient member, the said detector element having a low response to vibrations of a wave length higher than its own length; and electrical means for amplifying and utilizing the said voltages.

3. A device for detecting frictional contact comprising in combination a cord-like resilient member; means for mounting said resilient member relatively rigidly at its ends so as to expose at least part of its intermediate portion for frictional contact; an electrical detector element mounted on said resilient member and adapted for generating voltages in response to flexing of a short length relative to the fundamental resonant wave length of said resilient member, the said detector element having a low response to the fundamental frequency of the said resilient member; and electrical means for amplifying and utilizing the said voltages.

4. A device for detecting frictional contact comprising in combination a stationary support; two relatively large inertia masses; vibration damping means for supporting said masses in spaced relationship from said stationary support; a resilient cord-like member having its ends rigidly attached to said masses so as to be suspended therebetween under tension and so as to be exposed to frictional contact; an electric detector element mounted on said resilient member and adapted for generating voltages in response to flexing of a short length relative to the fundamental resonant wave length of said resilient member, the said detector element having a low response to the fundamental frequency of the said resilient member; and electrical means for amplifying and utilizing the said voltages.

5. A device for detecting frictional contact comprising in combination a resilient member capable of vibrating when exposed to frictional contact; mounting means for said resilient member exposing the same to such contact; a piezoelectric crystal of the bender type mounted on said resilient member and adapted to generate voltages in response to flexing of a short length relative to the fundamental resonant wave length of said resilient member, the said piezoelectric crystal having a low response to the fundamental frequency of said resilient member; and electrical means for amplifying and utilizing the said voltages.

6. A device for detecting frictional contact comprising in combination a resilient member capable of vibrating when exposed to frictional contact; mounting means for said resilient member exposing the same to such contact; a detector element of electromagnetic construction mounted on said resilient member and adapted for generating voltages in response to flexing of a short length relative to the fundamental resonant wave length of said resilient member, the said detector element having a low response to the fundamental frequency of the said resilient member; and electrical means for amplifying and utilizing the said voltages.

7. A device for detecting frictional contact comprising in combination a resilient member capable of vibrating when exposed to frictional contact; mounting means for said resilient member exposing the same to such contact; an electrical detector element mounted on said resilient member and adapted for generating voltages in response to flexing of a short length relative to the fundamental resonant wave length of said resilient member, the said detector element having a low response to the fundamental frequency of the said resilient member; electrical means for amplifying and utilizing the said voltages; and screen means associated with said electrical detector element for reducing the effect of extraneous atmospheric vibration.

8. A device for detecting frictional contact comprising in combination a resilient member capable of vibrating when exposed to frictional contact; mounting means for said resilient member exposing the same to such contact; an electrical detector element mounted on said resilient member and adapted for generating voltages in response to flexing of a short length relative to the fundamental resonant wave length of said resilient member, the said detector element having a low response to the fundamental frequency of the said resilient member; electrical means for amplifying and utilizing the said voltages; and a band pass filter forming part of said amplifying means, the said filter being responsive to a frequency band that includes the majority of wanted frequencies and excludes the majority of unwanted frequencies.

9. A device for detecting breakage of a sliver or similar thread-like product used on textile machines comprising in combination a resilient cord-like member capable of vibrating when exposed to frictional contact; means for suspending said member under tension across the roving frame or a similar part of the textile machine beneath the path of the sliver or like product whereby said resilient member will be subjected to vibrations when one end of the broken sliver falls onto it; an electrical detector element mounted on said resilient member and adapted for generating voltages in response to flexing of a short length relative to the fundamental resonant wave length of said resilient member, the said detector element having a low response to the fundamental frequency of the said resilient member; and electrical means for amplifying and utilizing the said voltages.

MAURICE KENYON TAYLOR.

REFERENCES CITED

The following references are of record in the file of this patent:

UNITED STATES PATENTS

| Number | Name | Date |
|---|---|---|
| 1,900,038 | Bower | Mar. 7, 1933 |
| 1,948,104 | Firestone et al. | Feb. 20, 1934 |
| 2,359,245 | Ritzmann | Sept. 26, 1944 |